March 28, 1950 E. E. KLEINSCHMIDT 2,502,013

TELEGRAPHIC COMMUNICATION SYSTEM

Original Filed Dec. 24, 1943 3 Sheets-Sheet 1

INVENTOR.
Edward E. Kleinschmidt
BY Strauch & Hoffman
attorneys

March 28, 1950 E. E. KLEINSCHMIDT 2,502,013

TELEGRAPHIC COMMUNICATION SYSTEM

Original Filed Dec. 24, 1943 3 Sheets-Sheet 2

INVENTOR.
Edward E. Kleinschmidt
BY Strauch & Hoffman
attorneys

March 28, 1950 E. E. KLEINSCHMIDT 2,502,013

TELEGRAPHIC COMMUNICATION SYSTEM

Original Filed Dec. 24, 1943 3 Sheets-Sheet 3

INVENTOR.
Edward E. Kleinschmidt
BY Strauch & Hoffman
attorneys

Patented Mar. 28, 1950 2,502,013

UNITED STATES PATENT OFFICE 2,502,013

TELEGRAPHIC COMMUNICATION SYSTEM

Edward E. Kleinschmidt, Miami Beach, Fla.

Original application December 24, 1943, Serial No. 515,562. Divided and this application October 7, 1946, Serial No. 701,658

10 Claims. (Cl. 178—3)

This invention relates to telegraphic communication systems and is a division of my copending application for patent, filed December 24, 1943, Serial No. 515,562, issued June 28, 1949, as Patent No. 2,474,257.

The present invention is applicable to either automatic or manually controlled systems for switching telegraph messages and has for its general object and purpose to provide means for simultaneously transmitting a plurality of code signal combinations in a group to switching mechanism interconnecting communication channels which, in the present application, is characterized by an efficiently operating means for transmitting in one operation a plurality of code signal combinations such as the address of a message to an automatic switch.

Telegraphic switching systems as heretofore proposed have been comparatively complicated and required the numbering of messages by the automatic transmission of successive numbers over trunk circuits. To prevent the loss of messages in such prior systems, a great amount of manual supervision is required and it has also been necessary, in the manually operated system, for the switchboard operator to read a printed or perforated tape to determine the destination of the message so that he may switch it to the proper circuit.

In my Reissue Patent No. 22,723, issued February 19, 1946, there is disclosed a method of code address transmission in which an address transmitter transmits single groups of signals corresponding to different letters, one at a time, to individual selectors, of which there is one for each letter of the code address. Each selector when operated connects the transmitting circuit to a trunk connected to the next selector which in turn, when operated by a following letter combination, connects the transmission circuit to the next selector in the series. This operation continues progressively until a final outgoing or subscriber trunk is reached. When a through connection has been made and the circuits are ready to receive message transmission the perforated tape is pulled back to its starting point, after transmission of the address codes, so that the address code of the message may be transmitted with the message.

The above method of operation is time consuming and requires considerable expensive apparatus. My present invention is distinguished therefrom in that during each interval of rest of the perforated tape or other record medium the entire number of code address combinations are simultaneously transmitted to set the switching apparatus, after which, when a trunk circuit has been established, the transmitter is rendered ineffective to transmit all but one of the groups of address code combinations and to start message transmission from a single remaining group of address code combinations before the record medium is moved to the following message transmitting position.

To eliminate these objectionable features and economize in the consumption of line time, it is a further object of the present invention to provide a code record controlled transmitter with a group of sensing devices for successively sensing message code combinations, and a plurality of groups of code sensing devices for simultaneously sensing a plurality of message address code combinations, and means for selectively controlling the cooperative relationship between said groups of sensing devices and the code record in the successive transmission of a plurality of messages.

It is a more particular object of the invention in one embodiment thereof, to provide a tape transmitter in which the tape is provided with a plurality of rows of code signal perforations, together with cooperative sensing devices controlling circuit closing contacts. These circuits in a manual system may be connected to indicator lamps on an operator's switchboard, or, in an automatic system, to control the operation of selector mechanism and transmit the address of the message and also indicate whether the message is ordinary, urgent or deferred.

Other subordinate objects of the invention will become apparent from the following description and claims.

In the drawings, wherein I have disclosed one practical embodiment of the invention, and in which similar reference characters designate corresponding parts throughout the several views.

Figures 5, 5A, 6, 7, 8:
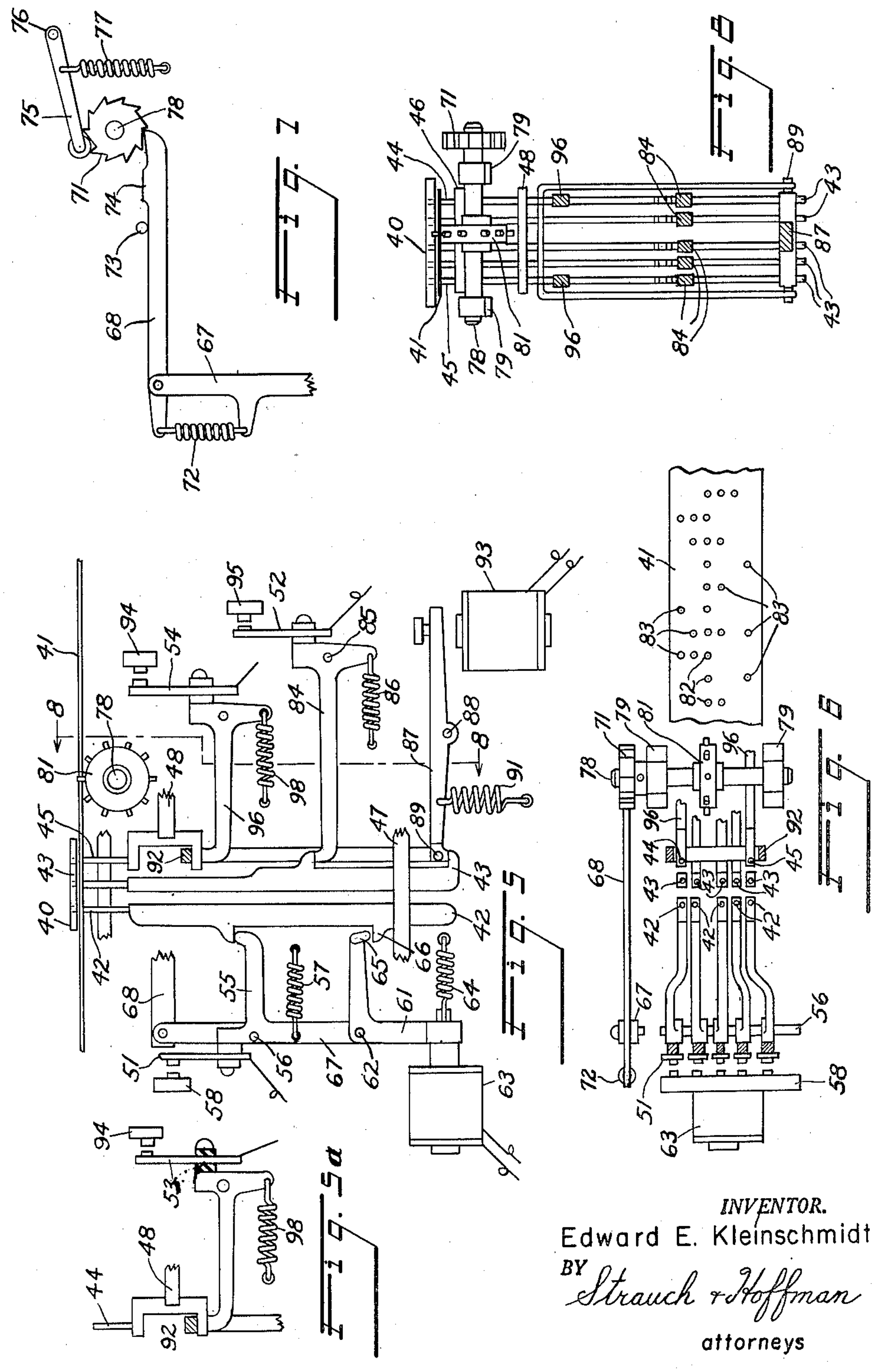
Figure 5 is a side elevation partially in section showing the essential elements of a preferred form of tape transmitter used in the preferred embodiment of my invention.
Figures 9, 10:
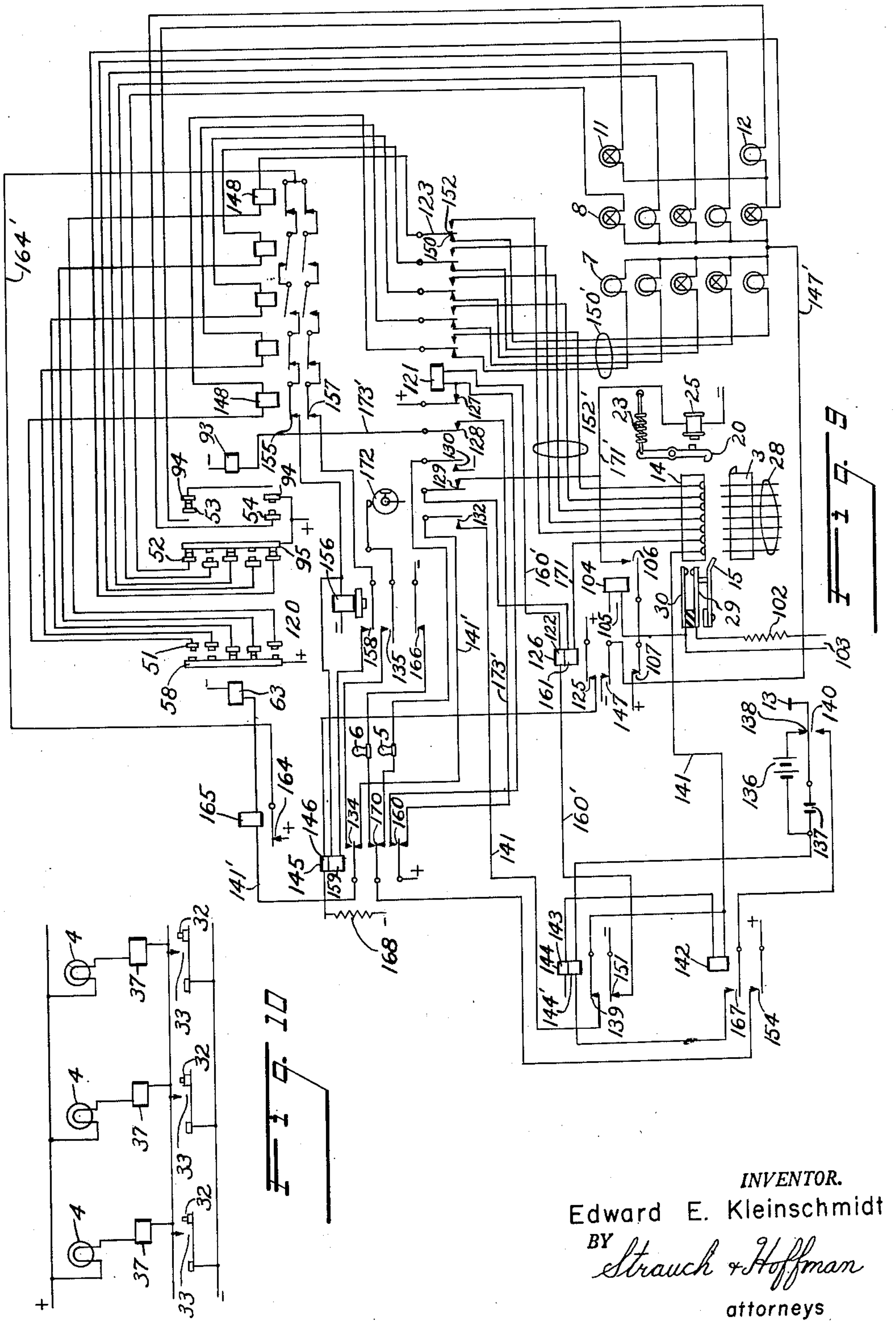

Figure 5*a* is a similar view of certain of the elements not seen in Figure 5;

Figure 6 is a plan view with parts broken away of the mechanism illustrated in Figure 5;

Figure 7 is a fragmental side elevation of the stepping mechanism illustrated in Figure 6;

Figure 8 is a sectional view along line 8—8 of Figure 5;

Figure 9 shows the circuits from an incoming line to the jack and the various indicator lamps at the switchboard; and Figure 10 shows the switchboard busy circuit.

Figures 1, 2:
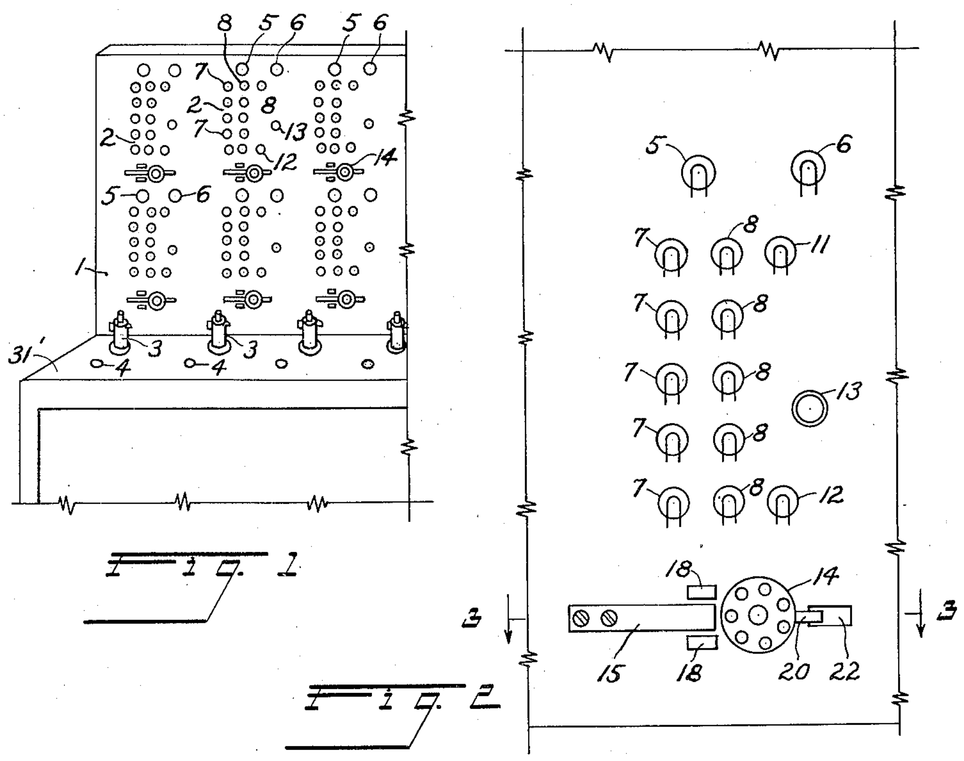
Figure 1 illustrates more or less diagrammatically a section of an assembled switchboard to be used in the preferred embodiment of my invention.
Figure 2 illustrates diagrammatically one panel of an incoming circuit at the switchboard.

Referring to Figure 1, included in the switchboard assembly 1 are the panel assemblies 2 of incoming lines which may be multipled to various switchboard positions in usual manner. Plugs 3 are connected to outgoing trunks multipled to various switchboard positions. Signal lights 4 are connected to indicate busy trunks in well known manner.

Figure 3:
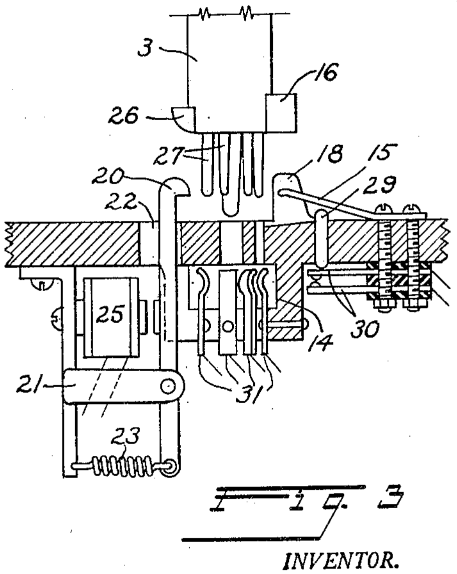
Figure 3 is an enlarged detail section on the line 3—3 of Figure 2, showing the construction of the jack and plug.

In the panel assembly (Figure 2) of an incoming line; white indicator lamp 5 flashes during the transmission of a message; red indicator lamp 6 flashes to indicate trouble when the answerback message is not received; the first two rows 7 and 8 of five lamps each indicate the address of the ultimate distributing point for the message; a deferred message is indicated by the lamp 11; and an urgent message is indicated by the lamp 12 all as will more fully hereinafter appear. The circuit arrangements for lamps 11 and 12, as hereinafter pointed out, are such that when both are lighted at the same time, the indication is for an ordinary message. Start button 13 is operated to start transmission. Jack 14 is provided with an ejecting spring 15 which engages flange 16 of the multiple contact plug 3 when the plug is inserted in jack 14. Flange 16 must fit between guide walls 18 to insure proper insertion of the plug. Hook lever 20 is pivoted on a bracket 21 and normally held against the edge of opening 22 by a spring 23. Magnet 25 when energized attracts hook lever 20 to release it from lug 26 of plug 3 thus permitting spring 15 to eject plug 3 out of its socket. Contact pins 27, of which there are seven carried by plug 3, are connected through cable 28 to circuits at an outgoing channel as will be described later. When plug 3 is inserted in jack 14, spring 15 presses an insulated plunger 29 against contact springs 30 to close them, and pins 27 each engage one of seven contact springs 31, only four springs 31 being shown in Figure 3. Contact springs 31 are connected to circuits of a local transmitter as will be described later.

Figure 4:
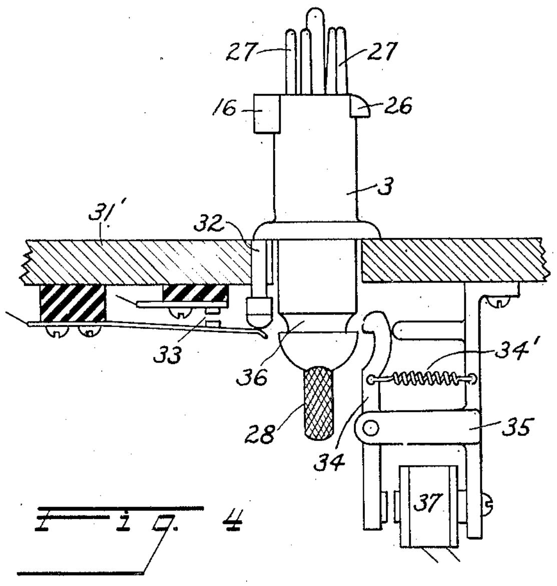
Figure 4 shows the plug in its seat at the switchboard and associated connections and locking device.

In Figure 4 plug 3 is shown resting in its socket on table portion 31' of the switchboard. When in this position, it depresses button 32 which disengages busy contacts 33 to hold the circuit of signal lamp 4 normally open, as in Figure 10. A hook lever 34 pivotally mounted in a bracket 35 is normally held out of contact by spring 34' with ledge 36 forming a part of plug 3. A magnet 37 included in the busy circuit and mounted on bracket 35 attracts hook lever 34 to engage same with ledge 36 when the trunk to which the plug is connected is busy, all as more fully hereinafter described.

Referring to Figures 5, 6, 7 and 8 which show the operating parts of a preferred tape transmitter used in my system, perforated tape 41, movable beneath a perforated plate 40, is engaged by a row of five tape feelers 42 for sensing messages and at times address signals. A row of five tape feelers 43 sense tape 41 for address signals. Deferred message signals are sensed by tape feeler 44, and tape feeler 45 senses tape 41 for urgent message signals. All of the tape feelers are guided at their upper ends in a plate 46, tape feelers 42 and 43 are guided at their lower ends in a slotted plate 47, and tape feelers 44 and 45 are guided in plate 48. The upper ends of the several tape feelers are received in the registering perforations of plate 40. Each tape feeler has associated with it a contact lever; those associated with tape feelers 42 are numbered 51; those associated with the tape feelers 43 are numbered 52; the one associated with tape feeler 44 is numbered 53 (Figure 5*a*); and the one associated with tape feeler 45 is numbered 54. Contact members 51 are individually supported by insulated mountings on levers 55 pivoted on a common bearing 56 carried on the supporting framework, not shown. Springs 57 act on levers 55 to urge the connected tape feelers 42 upward and contact member 51 against a common contact bar 58. A bell crank armature lever 61 pivoted on a bearing 62 is shown attracted by transmitter operated magnet 63. A spring 64 retracts armature lever 61 when magnet 63 is de-energized. The horizontal arm of bell crank lever 61 has a terminal bail 65 which engages all of the ledges 66 forming a part of tape feelers 42 so that, when magnet 63 is energized as shown, all tape feelers 42 are withdrawn from engagement with tape 41 and contact 51 is disengaged from contact bar 58. An upward extension 67 (Figures 6 and 7) from bell crank lever 61 carries a pawl 68 which is held in operative contact with ratchet 71 by spring 72. A stud 73 engages ledge 74 forming a part of pawl 68, when magnet 63 is de-energized and bell crank armature 61 moves in its retracted position. Detent lever 75 mounted on a bearing 76 is pressed against ratchet 71 by spring 77 to hold the ratchet in the set position. Ratchet 71 is fastened to a shaft 78 mounted in bearings 79 (Figure 6). A feed wheel 81 also fastened to shaft 78 is equipped with pin projections which engage the feed holes 82 of the transmitting tape 41 to feed the tape step-by-step by the action of operating magnet 63.

Code holes 83 are perforated in the tape to correspond with the code combinations required for each character to be transmitted. As the tape is fed through the transmitter step-by-step during the transmission of a message, tape feelers 42 either press against the tape 41 or pass through a code hole 83 and permit the associated lever 55 to move its contact member 51 against contact bar 58. The plate 40 is so positioned with respect to tape 41 that those of the tape feelers 42 which engage blank tape, that is, where there are no code perforations, do not permit lever 55 to move a sufficient distance to allow contact lever 51 to engage contact bar 58. This operation of similar parts in standard tape transmitters is well known.

Tape feelers 43, 44 and 45 are added to the standard tape transmitter mechanism for the purpose of reading the address of a message and/or for controlling automatic switches when used. Tape feelers 43 are individually associated with contact levers 84 which carry contacts 52 and are pivoted on bearings 85 and pressed upward by individual springs 86. All of the tape feelers 43 are normally held out of engagement with tape 41 by a terminal bail 89 forming a part of armature lever 87 and pivoted on a bearing 88, by the action of spring 91. Tape feeler 44 associated with contact 53 and tape feeler 45 associated with contact 54 are held in their normal lower position by a bail 92 operatively connected to bail 89. Levers 96 carry the contacts 53 and 54 respectively and are actuated to circuit closing position by springs 98. It will be understood that the armature spring 91 is of greater strength than the springs 86 and 98 to restrain action of the latter and normally maintain contacts 52, 53 and 54 in open-circuit position. When the address of a message is to be transmitted, magnet 93 is energized to release tape feelers 43, 44 and 45 which thereupon assume positions in accordance with perforations in the tape. Those passing through code perforations in the tape permit corresponding levers 84 and 96 to be operated to move contacts 52, 53 and 54 carried thereby into circuit closing engagement with common bars 94 and 95. Magnet 93 remains de-energized during message transmission.

The system herein disclosed contemplates that the receiving operator (a telegraph employee) when receiving a message from the public over the telephone at a branch office or over a subscriber teletype circuit will prefix each message when retransmitting it into the switching system with the code address of the ultimate central office distributing point, such code address to include special signals to indicate whether the message is an ordinary one, a deferred message, or an urgent message. Two letter code combinations will indicate the ultimate central office and the third combination will indicate the type of message. At the end of the message he adds a message end signal combination.

*Switchboard connection from incoming line*

Referring now to Figure 9, Sheet 3, which shows the circuit arrangements associated with the transmitter of an incoming line, transmitter 120 is constructed in accordance with the showings of Figures 5, 6, 7 and 8, Sheet 2. The parts shown in this view, which are numbered correspondingly, are controlled by perforated tape 41 in the manner previously explained. The connections of the transmitter, as well as the relay positions in this view, are in the condition they will be in when a message is waiting to be transmitted. At this time transfer relay 121 will be energized. Address magnet 93 will be energized permitting tape feelers 43, 44 and 45 to engage the message tape. Transmitter operating magnet 63 will be de-energized permitting tape feelers 42 to engage the message tape.

It is assumed that the perforations in the tape at that time will be such as to set contacts 51, 52, 53 and 54 in the positions shown in Figure 9. Current will pass from plus battery contact bar 58, through the connected contact members 51, selecting relays 148, to corresponding armature levers 123 of transfer relay 121, contacts 150, wires 150' and to address lamps 7, wire 147', contacts 147, and negative battery. Current will also pass from plus battery, common bar 95 to the connected contact members 52 and lamps in group 8, contacts 147, to negative battery, and to contact member 53, lamp 11, contacts 147, to negative battery. In accordance with the connection shown the third and fourth lamp in group 7, the first, third, and fifth lamp in group 8, and lamp 11 will be lighted indicating on the address lamps that the message waiting is a deferred one, destined for N Y which are the symbols for New York. This address and type of message will be read by the switchboard operator who then inserts a plug 3 connected to a New York trunk in a jack 14 connected to the waiting message, or if the lines are busy and since the waiting message is a deferred one, inserts a plug 3 that is connected to storage apparatus especially provided for deferred messages. The storage apparatus may be located at the New York trunks or may be connected to special switchboard positions.

*Transmission from incoming circuit*

Before describing the operation of relays, etc., when a plug 3 is connected to the circuit, I will give a general description of the condition of the circuits at the time of a waiting message, that is, when the address lamps are lighted. Only relay 121 and holding coil 122 of relay 126 are energized at this time. Relay 121 was energized by the operation of the message end signal and relay 126 was energized by the answerback signal. Battery 136 is at this time charging condenser 137 through contacts 138. Holding coil 122 of relay 126, holding coil 143 of relay 144 and holding coil 146 of relay 145 are composed of windings of a comparatively small number of turns, insufficient when energized to attract the armatures of the relays but sufficient to hold the armatures attracted after the relays are operated by their respective operating coils.

When a switchboard operator inserts a plug 3 in jack 14 to transmit the waiting message, sixth pulse impulses from the trunk to which plug 3 is connected will periodically pass over wire 141 from positive battery at the trunk through relay 142, holding coil 143 of relay 144 and negative battery. Start key 13 is now depressed closing contact 140 to prepare a circuit for the discharge of condenser 137 which is closed through operating coil 144' of relay 144 when contacts 167 are closed by a sixth pulse arriving on wire 141. Energized holding coil 143 holds relay 144 operated during the sixth pulse. The pulse from start key 13, when that is depressed, is a momentary condenser discharge, so that if the key is held down during the transmission of one or two letters, nothing occurs. Contacts 151 and 139 of relay 144 will be opened during this sixth pulse interval. The holding circuit for coil 143 is energized by recurrent sixth pulses and operates to hold contacts 139 and 151 open only during the full length of the first sixth pulse after coil 144 is energized by the discharge of condenser 137, which is of very short duration. Subsequent sixth pulses do not attract the armature of relay 144. Contacts 151 open the holding circuit for relays 121 and 126. Contacts 139 open the sixth pulse circuit wire 141' to relay 165 and magnet 63. Relay 126 when released opens contacts 147 disconnecting negative battery from the address lamps and closes contacts 125 which close a circuit from positive battery through holding coil 146 of relay 145, resistance 168 and negative battery. Relay 121 when released by the opening of contacts 151 opens contacts 128 in circuit with address magnet 93 which releases armature 87, and tape feelers 43, 44 and 45 are released from engagement with tape 41 by the action of spring 91 (Figure 5, Sheet 2). Selected contacts 51 will however remain in contact with common bar 58. The sixth pulse now on wire 141 cannot at this time pass to relay 165 and transmitter operating magnet 63 over wire 141' and closed contacts 132 of relay 121, since contacts 139 of relay 144 are open during the first sixth pulse interval. Selected contacts 51 will therefore remain in the set position after the first sixth pulse is received on wire 141 and the first code combination in tape 41, forming a part of the address of the message, will be transmitted over relays 148, contacts 152, wires 152', jack 14, plug 3, and through cable 28 to a bank of relays at the connected trunk. The second and following pulses passing over the sixth pulse circuit 141 and 141' will not operate relay 144 but operate relay 165 and magnet 63 through contacts 139 of relay 144, wire 141', contacts 132 of relay 121, and contact 133 of relay 145 to relay 165 and transmitter operating magnet 63 to negative battery, and step transmitting mechanism for tape 41 through transmitter 120.

Relay 142 will also be operated but will close no circuits other than through contacts 154, lighting white lamp 5 with every sixth pulse through closed contacts 170 of relay 145, and 130 of relay 121, thus giving the switchboard operator an indication that the message is being transmitted.

The transmission of the full address and message continues until the message end signal combination in tape 41 reaches feeler pins 42. The message end signal combinations used for the purpose of this description of the invention are the code combination commonly used for carriage return comprising three spacing, one marking and one spacing signals followed by a blank code combination, that is, one containing five spacing signals. The carriage return code combination always sets relays 148 to close series contacts 155, closing a circuit from positive battery, contacts 164 of relay 165, wire 164′, contacts 155, relay 156 to negative battery. Relay 165 opens this circuit during the sixth pulse interval to prevent relays 148 getting false impulses during the contact setting period. Relay 156 is sufficiently slow release to hold its armatures attracted over the sixth pulse interval. The closing of contacts 158 and 135 by relay 156 and the opening of contacts 166 will have no effect since the connected circuits are open at other points at this time. When however a blank code combination immediately follows a carriage return combination, all the relays 148 remain de-energized and series contacts 157 of relays 148 are closed before relay 156 releases its armatures and current now passes through contacts 158, operating coil 159 of relay 145, relay 156 to negative battery. Relay 145 is operated and held so by the energized holding coil 146, until the answerback signal is received. Contacts 160 of relay 145 close a circuit over wire 160′ from positive battery through relay 121, holding coil 122 of relay 126, contacts 151 to negative battery. Relay 121 operates to move armatures 123 from contacts 152 to contacts 150 transferring the circuits from contacts 51 to the address lamps 7. Relay 121 closes contacts 127 which close a self-locking circuit that remains closed until start key 13 is depressed. Relay 145 opens contacts 133 and closes contacts 134 transferring the circuit of relay 165 and magnet 63 from the outgoing trunk sixth pulse on wires 141 and 141′ to an auto-pulsing circuit 172 through closed contacts 135. The auto-pulses periodically energize relay 165 and magnet 63, which impart step movements to the tape 41 over feeler pins 42 until a code perforation is reached. One or more of the relays 148 are then energized and the circuit through series contacts 157 interrupted, whereupon relay 156 is released and contacts 135 opened disconnecting the auto-pulsing circuit 172 and leaving transmitter 120 at rest, with feeler pins 42 pressed against tape 41. Contacts 166, relay 156 and closed contacts 170 of relay 145 close a circuit through red trouble lamp 6 which flashes by the periodic closing of contacts 154 of relay 142 until the answerback signal is received. Contacts 129 of relay 121 close to prepare the answerback circuit from wire 171. Contacts 128 of relay 121 close to prepare the circuit for address magnet 93. Contacts 130 of relay 121 open the circuit for white lamp 5. Contacts 132 of relay 121 open the sixth pulse circuit to relay 165 and magnet 63. Under normal conditions when no faults exist in either the circuits or apparatus, the answerback signal is received on wire 171 within one second after the message end signal is transmitted from contacts 51. The answerback signal when received passes through operating coil 161 of relay 126 and disconnect magnet 25 over wire 171′. Relay 126 when operated remains so until key 13 is depressed to start a new message. Magnet 25 releases plug 3, whereupon spring 15 ejects it from jack 14. Relay 126 opens contacts 125 de-energizing holding coil 146 and relay 145 is released. Contacts 147 of relay 126 connect negative battery to address lamps 7, 8, 11 and 12. When relay 145 is released, it closes the circuit to address magnet 93 through contacts 173, wire 173′ and closed contacts 128 of relay 121. A combination of lamps 11 and 12 and certain of the lamps in groups 7 and 8 are now lighted in accordance with the code combinations of the address characters in the next waiting message. As before stated relays 126 and 121 remain operated. The switchboard operator now reads the address lamps for the destination of the message and inserts in jack 14 a plug 3 that is connected to an outgoing trunk that will carry the waiting message to its destination after which he depresses the key 13 to start transmission.

If an answerback signal is not received on wire 171, red trouble lamp 6 will flash and plug 3 will remain connected to jack 14. When this occurs the switchboard operator summons a service attendant who communicates with a service attendant at the receiving station. When the fault is located and repaired, transmission is restarted.

Contacts 129 of relay 121, which are open during message transmission, are provided to prevent an answerback impulse on wire 171 from operating relay 126 or disconnecting magnet 25 at any time other than after a message has been transmitted.

From the foregoing it will be seen that I have provided simple and reliable operating means for conditioning the interconnecting switch mechanism between communication channels, in which a plurality of groups of message address code signals are simultaneously transmitted to said mechanism, and message character code combinations are successively transmitted to said switch mechanism, together with means controlling the transmission of the message address and character code combinations in predetermined order. Thus, the successive and accurate transmission of messages with their respective addresses may be rapidly completed, with a minimum consumption of line time, while simultaneously with the transmission of the message address code combinations, said switch mechanism is conditioned to indicate whether the message is one of the ordinary, deferred or urgent type. Of course, if desired the tape transmitter may be provided with additional rows of code perforations and sensing devices for the transmission of other code signal combinations of special significance.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for transmitting permutation code telegraph signals comprising circuit switching apparatus, a record medium carrying differing combination code groups in each of a plurality of adjacent rows; means for simultaneously sensing code groups in the adjacent rows operatively connected with said switching apparatus to condition the latter in accordance with combination code groups of differing composition; and means associated with and controlled by said switching apparatus, after a circuit connection has been closed to render said code sensing means inoperative with respect to all but one of the rows of code groups carried by the record medium.

2. In a telegraph message transmission system, circuit switching apparatus, message transmitting apparatus operatively connected with said switching apparatus and comprising a plurality of groups of code sensing devices, means to simultaneously move all of said groups of devices to code sensing position and condition the transmitting apparatus to simultaneously transmit a plurality of different code signal combinations to said circuit switching apparatus, and means thereafter operable to render all but one of said groups of code sensing devices ineffective and condition the transmitting apparatus to transmit message data to the switching apparatus by said one group of sensing devices.

3. The telegraph message transmission system as defined in claim 2, in which one group of code sensing devices conditions the transmitting apparatus to transmit to said circuit switching apparatus code signals identifying the type of message to be transmitted.

4. In a telegraph message transmission system, circuit switching apparatus, means operatively connected with and controlling said switching apparatus comprising a plurality of groups of code sensing devices simultaneously operable to effect a plurality of different settings in said switching apparatus in accordance with the message address and type code signal combinations, and means thereafter operable to render only a selected one of said groups of code sensing devices effective to transmit message address and code signal combinations.

5. In a system including switching devices for transmitting permutation code telegraph messages, wherein each code combination represents a character in a message and a plurality of code combinations represent the destination of the message; transmitting apparatus operatively connected with said switching devices and including a movable record medium, means controlled by said record medium to transmit individual character code combinations at definite time intervals, and additional means controlled by said record medium to simultaneously transmit a plurality of different code combinations representing the destination and type of message and condition said switching means to transmit said individual character code combinations.

6. In a system for transmitting telegraph messages having a plurality of incoming and outgoing circuits and switching apparatus for selectively interconnecting said circuits; permutation code transmitting apparatus, means for selectively connecting individual incoming and outgoing circuits with said transmitting apparatus according to the address and type of the message, said transmitting apparatus including a movable record medium, means controlled by said record medium to transmit individual message code combinations at definite time intervals, and additional means controlled by said record medium to simultaneously transmit a plurality of different address code combinations and condition said switching apparatus to transmit said individual message code combinations.

7. In a system of telegraphic communication including switching means by which messages are transmitted and received in permutation code combination; a code record controlled transmitter operatively connected with said switching means and comprising a group of code sensing devices for successively sensing message code combinations, a plurality of additional groups of code sensing devices for sensing adjacent code combinations, means for rendering said first and additional groups of codes sensing devices simultaneously effective to condition said circuit switching means, and means for causing an independent sensing operation by said first group of devices after the sensing operation of said additional groups of devices has been completed.

8. In a telegraph system including circuit switching devices, a permutation code transmitter operatively connected with said switching devices and comprising a plurality of code sensing devices adapted to be operatively controlled by a perforated tape, said groups of sensing devices being arranged in contiguous order to sense adjacent code groups of tape perforations, means for rendering all groups of sensing devices effective to simultaneously sense the tape perforations and condition said switching devices, and additional means responsive to the closure of a message transmitting circuit by said switching devices to render all but one of said groups of sensing devices inoperative while said one group effectively senses message code perforations in the tape.

9. A permutation code signal transmitter for telegraph systems comprising a record medium carrying successive groups of code indications, a plurality of groups of code sensing devices, means for imparting intermittent step movements to the record medium in one direction to successively position the groups of code indications in cooperative relation to all of said groups of sensing devices, and means operative during each interval of rest of the record medium to first cause the simultaneous effective operation of all groups of sensing devices and then render all but one of said groups of devices ineffective to sense the code indications of the record medium.

10. In a telegraph transmission system including circuit switching apparatus; a telegram code sensing and transmitting mechanism for sensing a record medium provided with contiguously placed groups of permutation code indications, said mechanism comprising means for simultaneously sensing and transmitting a plurality of contiguously placed groups of code combinations under control of the record medium to circuit switching apparatus and additional means operatively controlled by the record medium and said switching apparatus to sense and transmit only single groups of permutation code combinations to a message transmitting circuit.

EDWARD E. KLEINSCHMIDT.

REFERENCES CITED

The following references are of record in the file of this patent:

UNITED STATES PATENTS

| Number | Name | Date |
|---|---|---|
| Re. 22,723 | Kleinschmidt | Feb. 19, 1946 |
| 702,149 | Norden | June 10, 1902 |
| 758,342 | Wahl | Apr. 26, 1904 |
| 1,462,875 | Stoddard | July 24, 1923 |